United States Patent
Paul

(10) Patent No.: US 8,975,320 B2
(45) Date of Patent: Mar. 10, 2015

(54) FLAME RETARDANT ADDITIVE FOR POLYMERS, FREE OF HALOGENS, ANTIMONY OXIDE AND PHOSPHORUS CONTAINING SUBSTANCES

(75) Inventor: Swaraj Paul, Spanga (SE)

(73) Assignee: PP Polymer AB, Vallingby (SE)

( * ) Notice: Subject to any disclaimer, the term of this patent is extended or adjusted under 35 U.S.C. 154(b) by 78 days.

(21) Appl. No.: 12/447,140

(22) PCT Filed: Oct. 25, 2006

(86) PCT No.: PCT/SE2006/001206
§ 371 (c)(1),
(2), (4) Date: Apr. 24, 2009

(87) PCT Pub. No.: WO2008/051120
PCT Pub. Date: May 2, 2008

(65) Prior Publication Data
US 2010/0004370 A1   Jan. 7, 2010

(51) Int. Cl.
*C08K 3/38* (2006.01)
*C09K 21/02* (2006.01)
*C08K 3/00* (2006.01)
*C09K 21/14* (2006.01)

(52) U.S. Cl.
CPC ............... *C09K 21/02* (2013.01); *C08K 3/0058* (2013.01); *C08K 3/38* (2013.01); *C09K 21/14* (2013.01)
USPC ........... 524/405; 524/401; 524/406; 524/434; 524/436; 524/437; 524/492; 524/493

(58) Field of Classification Search
CPC ........ C08K 3/0058; C08K 3/38; C09K 21/02; C09K 21/14
USPC ......... 524/405, 434, 436, 437, 492, 493, 401, 524/406
See application file for complete search history.

(56) References Cited

U.S. PATENT DOCUMENTS

| 5,218,027 | A | 6/1993 | Smith et al. |
| 5,457,164 | A | 10/1995 | Wilkie |
| 6,043,306 | A * | 3/2000 | Imahashi ...................... 524/436 |
| 6,750,282 | B1 * | 6/2004 | Schall et al. .................. 524/445 |
| 6,753,372 | B1 * | 6/2004 | Garcia Duran et al. ....... 524/437 |
| 7,041,737 | B2 * | 5/2006 | Nicholl et al. ................ 525/166 |
| 8,372,899 | B2 * | 2/2013 | Kotzev et al. ................ 523/179 |
| 2005/0131129 | A1 * | 6/2005 | Uehara et al. ................. 524/502 |
| 2006/0036006 | A1 * | 2/2006 | Heschke et al. .............. 524/101 |
| 2006/0084731 | A1 | 4/2006 | Troutman et al. |
| 2006/0214143 | A1 * | 9/2006 | Okoshi et al. ................. 252/609 |

FOREIGN PATENT DOCUMENTS

CN    1498244    5/2004

OTHER PUBLICATIONS

Zhang, "Polymer Combustion and Flame Resistant Technology", Chemical Industry Press, Apr. 30, 2005, relevant English translation included.
CN Office Action dated Dec. 9, 2010 from corresponding CN200680056389.5.
Guimond, Christopher, "The Effects of Using Mixtures of Magnesium Hydroxide, Zinc Borate and Silicone Powder on the Tensile Properties and Burn Characteristics of a Polythylene/EMA Blend", Society of Plastics Engineers, Annual Technical Conference (Antec), Proceedings, Society of Plastics Engineers, 1998, vol. 3, pp. 3406-3410, XP003012324.
Extended European Search Report, dated Jul. 29, 2013, from corresponding EP application.

* cited by examiner

*Primary Examiner* — David W Wu
*Assistant Examiner* — Marie Reddick
(74) *Attorney, Agent, or Firm* — Young & Thompson

(57) ABSTRACT

A flame retardant additive for polymers is disclosed which additive comprises a polyacrylate in combination with a) at least one zinc borate, b) at least one silicone resin, and c) alumina trihydrate or magnesium hydroxide or a mixture thereof, said additive being free of halogens, antimony oxide and phosphorus-containing substances. A flame retardant composition comprising a polymer and a flame retardant additive is also disclosed as well as a method of reducing the flammability of a polymer by mixing said polymer with said flame retardant additive.

20 Claims, 1 Drawing Sheet

Figure 1. The basic burning cycle
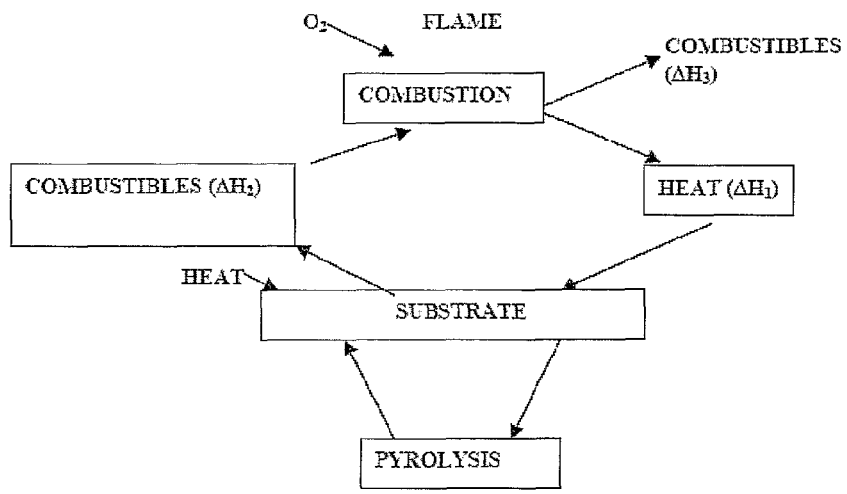
Figure 2. General scheme on reported prior art FR-additives
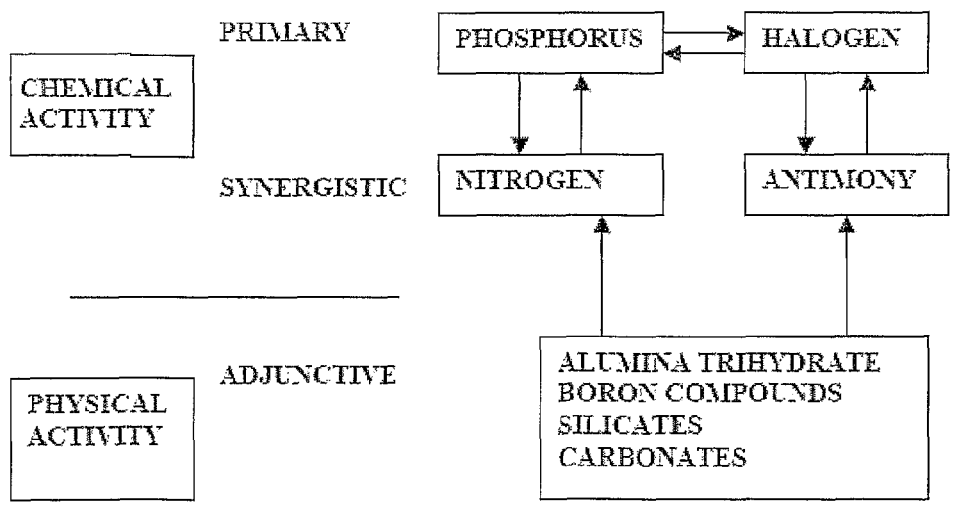

FLAME RETARDANT ADDITIVE FOR POLYMERS, FREE OF HALOGENS, ANTIMONY OXIDE AND PHOSPHORUS CONTAINING SUBSTANCES

TECHNICAL FIELD

The present invention relates to a flame retardant additive, a flame retardant polymer composition and a method of reducing the flammability of a polymer.

BACKGROUND ART

There are numerous ways to improve the non-flammability of polymer materials. The best and cheapest way to obtain non-flammability is by adding suitable additives to the polymers. Generally the loading levels of the additive should be restricted to as low levels as possible in order to keep the price of the final product at a reasonable level and also to avoid their influence on the physical and processing properties of the polymers.

In order to assure the good flame retarding properties of the additives it is very important to take into consideration the polymer structure with respect to burning properties, the causes for its burning properties and finally how the fire retarding properties are evaluated. Since, the effectivities of every specific formulations are very much dependent on the polymer structure and their degradation mechanisms, the subjective tests based on different standard methods for different products are not sufficient but instead parameters that are related to burning characteristic of the materials such as oxygen index (OI), onset degradation temperatures, rate of thermal degradation, activation energies for thermal degradation, char yield, peak heat release rates (HRR), smoke density and the types of emission products that are formed as a result of burning are very essential to measure and to take into consideration. Beside these fire-relating properties, influence of these additives on the mechanical and the processing properties for the specific polymers are also very important.

Almost all polymeric materials are comprised of organic materials. The major shortcoming of polymeric materials is their burning characteristics. The flammability of some polymers is higher than that of wood and natural fibres. The calorific values for some common polymers such as polyethylene, polypropylene, polystyrene, polymethylmethacrylate are 46000-27000 kJ/kg, whereas this value for wood is 19000 kJ/Kg. In addition, smoke and soot formation, droplets and emission of highly toxic products accompany the combustion of some polymer materials. Thus, the wide application of polymer material makes it necessary to develop fire-retarded materials. As indicated above, the cheapest way to obtain flame-retarded polymer materials is to add suitable types of fire-retardant additives instead of developing new polymers. How these additives then function as flame retardants is very much dependent on the mechanisms in which they interact with the polymer and how the basic burning properties are controlled.

BRIEF DESCRIPTION OF THE DRAWINGS

The background art will now be illustrated with reference to the accompanying drawing, wherein FIG. 1 shows the basic burning cycle; and FIG. 2 is a general scheme on reported prior art FR-additives As is evident from FIG. 1, heat is generated under fire conditions. This heat results into pyrolysis or thermal degradation of the polymeric materials forming combustible gases. These combustible gases create, in presence of oxygen, flame and smoke. Since combustion is an exothermic process, it generates more heat resulting into more pyrolysis of the materials and thereby supplying more fuel to the fire. This means that as soon as the material starts burning, the flame reactions just accentuates and it is difficult to stop the flaming process.

The above process sequence suggests that reduction of the flammability of materials in general, requires the following measures:

1 Increase in the thermal stability of materials.
2 Increase in the amount of char formation.
3 Decrease of transport of combustible gases from the material, formed as a result of pyrolysis, to the flame.
4 Reduction of the amount of heat generated as a result of fire.
5 Insulation of the material surface in order to reduce transfer of heat from the fire to the material.
6 Generation of inert gases from the materials as a result of combustion.

This suggests that in order to control the flammability of materials under fire situation, it is essential to control both the condensed-phase reactions in the polymer and the gas-phase reactions in the volatile phase formed as a result of material degradation. Condensed-phase reactions in the polymer phase mainly involve changes in the pyrolytic path of the polymer to favourable conditions so that the formation of combustible gases are substantially reduced.

Formation of lower amounts of combustible gases under fire conditions results into less generation of heat and thereby, reduces material flammability.

The general strategies, reported in the literature, to prepare thermally stable materials with inherently low flammability are to introduce the following in the structure:

1 Incorporation of halogen or phosphorus.
2 Increasing the C to H ratio.
3 Increasing the nitrogen content.
4 Incorporation of conjugation either through aromatic or heteroaromatic ring systems.
5 Incorporation of rigid structure such as semi-ladder or ladder polymers.
6 Incorporation of strong interactions between polymer chains.
7 Incorporation of high degree of crystallinity or cross-linking.

As mentioned above, flame-retardancy of the materials can also be improved if the extent of charring for the materials could be increased under fire conditions. This, in turn, will reduce the amount of combustibles formed under fire conditions. Basic reactions occurring in the gas-phase and the condensed-phase and how different factors affect such reactions are very briefly summarized below.

Gas-Phase Reactions

So far the gas-phase reactions are concerned, all polymeric materials undergo pyrolysis forming combustible gases. These gases are capable of forming hydrogen and hydroxyl radicals, which in turn, may react with oxygen as below:

$$H.+O_2 \rightarrow OH.+O. \tag{1}$$

$$O.+H_2 \rightarrow OH+H. \tag{2}$$

The main exothermic reaction in the flame comprise of:

$$OH.+CO \rightarrow CO_2+H. \tag{3}$$

In order to restrict or stop combustion, it is essential to stop or reduce the extent of these reactions especially reaction 3.

Condensed-Phase Reactions

Such reactions have been shown to include interaction between the FR and the polymer and occur at temperatures lower than the decomposition temperature of the polymers. Condensed-phase reactions generally comprise of dehydration and cross-linking reactions.

Dehydration is used very frequently in flame retardancy. Dehydration may result as a result of chemical reactions of the hydroxyl groups present in the polymer chains. Crosslinking reactions have also been found very useful because it promotes stabilization of polymers and also contribute to the char formation. Crosslinking has also been shown to increase the melt-viscosity of the polymers and thereby lowering the rate of transport of the combustible gases as a result of pyrolysis.

Physical Effects

Physical effects such as "dilution effects", "heat sink effects" and endothermic transitions in the additives have also been used to obtain flame retardancy of polymers. Dilution effects involve dilutions of the organic part of the structure and dividing it into small-insulated domains. This means that on pyrolysis, larger amounts of heat are required to reach pyrolysis temperature; therefore less combustible gases are formed thereby generating less heat. The latter effect is also referred to as "heat sink effect". Thus additives having high specific heats and low thermal conductivities exhibit enhanced flame retardancy. Also the endothermic decompositions of additives been used to reduce the flammability of materials.

Another physical effect, which has been used in flame retardancy is through the formation of impermeable skin of glass or char that hinders the passage of the combustible gases from the pyrolysing polymer to the flame front and at the same time act as an insulating layer for the transfer of heat from the flame to the polymer surface. The latter helps to reduce the pyrolysis of polymers and thereby decreases the formation of combustible fuel gases. The only limitation in obtaining fire retardancy by physical effects is that relatively large amounts of additives (50-65%) are required. Addition of such large amounts of additives may have a substantial influence on the mechanical and processing parameters of the polymers.

Flame retardant (FR) additives reported so far in the literature can, in general, be classified under the following categories as shown in FIG. 2.

An ideal FR-additive for a polymer should be easily incorporated into the polymer, be compatible with the polymer, and not alter its mechanical properties. It should be colourless; exhibit good light stability, and have resistance to ageing and hydrolysis. In the selection of flame-retardants, it is also essential to match the decomposition temperature of the FR with the polymer. In general, the effect of FR must begin below the decomposition temperature of the polymer and continue over the whole range of its decomposition cycle.

Function Mechanism of the Commercially Active Flame Retardant Additives

Halogen Based Flame Retardants (FR)

Halogen-based flame retardants function mainly through the gas-phase reactions. Halogen atom reacts with the fuel forming hydrogen halide. The latter is believed to function as flame inhibitor and consumes hydrogen and hydroxyl radicals as below:

$$H + HX = H_2 + X. \quad (4)$$

$$OH\cdot + HX = H_2O + X. \quad (5)$$

Reaction (4) was found to be twice as fast as (5) and has been shown to be the main inhibiting reaction. The inhibiting effect was shown to be dependent on the extents of reaction (4) and (1). This is because reaction (1) produces two free radicals for each H-atom consumed, whereas reaction (4) produces one halogen radical, which recombines to the relatively stable halogen molecule. The latter results into lower heat generation and thereby renders fire retardancy.

The flame retardant effectivity of halogens has been found to be directly proportional to their atomic weights as below:

F:Cl:Br:I=1.0:1.9:4.2:6.7

Because of higher effectivity of bromine compounds than chlorine compounds, they are used at lower concentrations. It has been shown that on a volumetric basis 13% bromine was found to be as effective as 22% chlorine. Iodine and fluorine compounds are not industrially interesting because the former is less stable and very expensive whereas the latter is very stable. For bromine compounds, their effectivity is also dependent on the type of bromine i.e. if the bromine is an aliphatic or an aromatic one. In general, aromatic bromine is much stable and volatile than the aliphatic ones therefore these compounds evaporate before they could decompose and thereby furnish halogen to the flame. Beside radical trap mechanism, flame retardancy is also affected by physical factors such as density and mass of the halogen, its heat capacity and its dilution of the combustible gases in the flame.

In general, halogen based systems are undesirable because it has been shown that aromatic halogenated fire retardants may give super toxic halogenated dibenzodioxines and dibenzofurans on heating.

Antimony Oxide as FR

Antimony oxide itself has no FR activity but in combination with halogenated compounds it functions as an effective FR. The main advantage of adding antimony oxide is to reduce the amount of halogenated FR, which has been found to negatively influence the mechanical properties of the plastics. As a general rule approximately 25% bromine or 40% chlorine in the form of organohalide is required to reduce the flammability of plastics to an acceptable level. It has been shown that good FR properties of plastics could be obtained by adding only 12% of decabromodiphenyloxide in presence of 5% antimony trioxide. In general, FR plastics containing organohalogen compounds require 2-10 wt-% of antimony.

In such FR systems, $SbX_3$ has been found to be the active component. At lower concentrations, oxychloride (SbOX) is the active component that has been shown to decompose in several endothermic stages at different temperatures to $SbX_3$ as below:

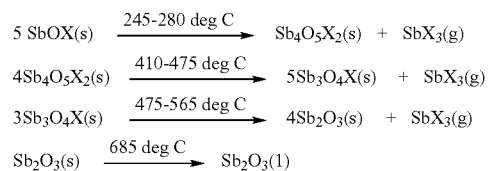

$SbX_3$ is released to the gas phase and undergoes a series of reactions with the volatile combustibles generating less heat. Such reactions involve reactions with atomic hydrogen producing HX, SbX, $SbX_2$ and Sb. Sb reacts with atomic oxygen, water and hydroxyl radicals, producing SbOH and SbO and remove them from the flame reactions. The SbO formed also scavenges H-atoms. SbOX, which is a strong Lewis acid, operates in the condensed-phase by facilitating dissociation of C—X bonds, releasing more halogen and forming char. Char formation inhibits further degradation of polymer and also reduces the surface area. Decrease in surface area results into formation of lower amounts of volatile combustibles due to volatilisation.

A fine dispersion of solid SbO and Sb is also produced in the flame, which catalyses hydrogen radical recombination. The latter results in a lower steady-state concentration of hydrogen radicals resulting into enhanced FR effect. Among the antimony compounds, only trioxide has been found to be most effective compared to tetra- and penta-oxide.

In a recent study (Danish Protection Agency 2001), antimony trioxide has been classified to be harmful ($X_n$) according to EU directive and must be labelled with the risk-phrase "Possible risk of irreversible effects" (R 40) due to possible carcinogenicity. The substance is reported as teratogenic. The effects in ecotoxicological test are primarily on algae ranging from very toxic to harmful. However, toxicity on crustaceans or fish is very low. Due to these hazardous reasons it is strongly desired that antimony trioxide should be substituted by less hazardous chemicals.

Alumina Trihydrate (ATH)

ATH has been used as a flame retardant and smoke suppressant since 1960's and is available in different particle sizes (PS) ranging from 5-25µ where superfine grades have PS between 2.6-4.0µ and ultrafine grades having PS between 1.5-2µ. ATH is also available in several surface modified grades in order to improve their process ability and compatibility. It has been shown that on thermal degradation ATH undergoes an endothermic decomposition at 200° C. Between 205 and 220° C., this decomposition is slow. Above 220° C., the decomposition becomes very rapid and hydroxyl groups of ATH begin to decompose endothermically. The major endothermic peak at 300° C. represents the decomposition of α-trihydrate to α-monohydrate and subsequently to γ-alumina. Heat of dehydroxylation has been found to be 280 cal/g (298 kJ/mol). ATH in dry form has been shown to contain 34.6% chemically bound water by weight.

Flame retardation by ATH has been shown partly to be due to the heat sink effect, as mentioned earlier, and partly due to the dilution of combustible gases by the water formed as a result of dehydroxylation. Alumina formed as a result of thermal degradation of ATH has been shown to form a heat-insulating barrier on the surface.

The only problem with ATH is that they are required at high loading levels in order to obtain equivalent flame retardancy as by other additives e.g. 100 to 225 parts per 100 parts resins (phr). Such high loadings may affect both the mechanical and the processing properties of the polymers.

Magnesium Based FR

Magnesium hydroxide functions both as flame retardant and smoke suppressant and also functions as an excellent acid scavenger. It releases 30-33% water at about 325° C. and about 50% loading by weight is required to obtain necessary FR properties. Heat of decomposition for Mg $(OH)_2$ is 328 cal/g.

Magnesium carbonate alone has also been found effective as smoke suppressant especially for PVC. It releases about 60% by weight water and 25% by weight $CO_2$ at 230° C. and 400° C. Magnesium based FR's are not very effective as FR-additives and are not very useful because they also require very high loading levels.

Phosphorus-Containing FR

Phosphorus-containing FR includes inorganic phosphates, insoluble ammonium phosphate, organophosphates and phosphonates, bromophosphates, phosphine oxides and red phosphorus. These types of FR can be active either in the condensed- or the vapour-phase or both. The mechanism for flame retardancy varies with the type of phosphorus compound used and the polymer type. However, two principal modes of reaction have been suggested for fire retardancy: dehydration and crosslinking.

During burning, Phosphorus FR produces non-volatile acids, which functions as dehydration catalysts. This, in turn dehydrates the polymer matrix forming graphite type char residue. The latter reduces the formation of flammable gases from the surface. These systems require oxygen and a source of phosphorus acids that are not volatile under the burning conditions. These agents display decreasing efficiency as FR as the oxygen content of the polymer decreases. Vapour phase activity of these agents is primarily observed for non-oxygen containing polymers. Due to their low molecular weights, they are volatile and are lost either during high temperature processing or in the early stages of combustion. Additionally, their transition to the gaseous phase can cause smoke from the burning material to contain toxic phosphorus containing compounds. In order to avoid such problems, organophosphorus functionality has been incorporated in the polymer structure.

Cross-linking, on the other hand, promotes char formation by creating a C—C network and resulting into decrease in chain cleavage. Phosphorus compounds are also used in intumescent systems.

Flame inhibition reactions similar to the halogen radical trap theory have been proposed where PO is generally the most significant species. The main reactions can be summarised as below:

$$H_3PO_4 \rightarrow HPO_2 + HPO + PO.$$

$$H.-PO. \rightarrow HPO$$

$$H.-HPO \rightarrow H_2 + PO.$$

$$OH. + PO. \rightarrow HPO + H_2O$$

$$OH. + H_2 + PO. \rightarrow HPO + H_2O$$

Phosphorus has been found to be synergistic with halogen compounds. Compounds containing both phosphorus and bromine in the same molecule have been shown to be much more effective than the blends of bromine and phosphorus additives.

Some of the commonly used phosphorus derivatives are red phosphorus, trialkyl phosphates, triaryl phosphates and halogen containing phosphates such as chloro- and bromo phosphates. It has been shown that by using brominated phosphates, good flame retardancy can be obtained without using antimony. Nitrogen containing polymers have been found to be synergistic with phosphorus compounds.

Phosphorus based FR additives have also been shown recently that they are not environment friendly and therefore their use FR has also been strongly questioned.

Beside the use of above mentioned FR-additives combination of additives have also been reported in order to devise the so called intumescing flame-retardant systems Almost all intumescing systems comprise, in general, of three basic components: 1) an acid source such as ammonium poly-phosphate (APP), 2) a charring agent such as pentaerythrytol (PER) and 3) a nitrogen blowing agent such as melamine.

In intumescing systems a series of chemical and physical processes occur during the pyrolysis and combustion of the materials. The chemical processes are: decomposition of APP to phosphoric acid, esterification (phosphorylation) of the polyol (pentaerythritol) followed by decomposition and regeneration of the phosphoric acid. Decomposition of melamine helps blow the resulting thick char that finally insulates the substrate from the flame and oxygen. The physical processes, which controls the flame retardancy includes diffusion and transport of combustible and incombustible gases through the polymer melt to the flame zone, transfer of the molten polymer and of the flame retarding molecules to the flame, diffusion and permeation through the char barrier.

All these reactions occur in a very short period of time with various reaction rates. These reaction rates determine the properties of the final char and the flaming behaviour of the materials. By properly designing these rates using proper formulations, it is possible to obtain desired fire retardant properties for different polymeric materials.

It is reported in the literature that fire-resisting properties of PP were strongly improved using the commercial additive Hostaflame AP750 from Hoechst in comparison with the model system APP/PER. This was shown to be due to the different thermal properties of the intumescent composition. The shield developed from the PP-AP750 system was found to show lower thermal diffusivity and high heat storage compared to APP/PER and this was proposed to be the reason why the substrate is protected longer and at higher temperatures than APP/PER. AP750 comprise of ammonium polyphosphate with an aromatic ester of tris(2-hydroxyethyl)iso-cyanurate and bound by an epoxy resin.

JP 57165435A discloses a flame-retardant polyolefin composition to be used as a covering material for electric wire and cable which composition comprises a basic polyolefin and a flame-retardant additive. The flame retardant additive includes halogen-containing compounds and inorganic compounds among which antimony trioxide is mentioned. In order to improve the insulation properties a synthetic insulating oil (e.g. a silicone oil) is added to the composition of basic polyolefin and flame retarder additive. Thus no flame retarding effect of the insulating oil nor of the polyolefin is claimed.

JP 4132753A discloses a flame-retardant polymer composition to be used as a covering material for electric wire and cable which composition comprises a basic polymer, art-recognized flame-retardant additives and a silicone oil. The art-recognized flame-retardant additives mentioned are hydroxyl-containing compounds of Mg and/or Al and Zn carbonate or borate (preferably the carbonate) at substantial concentrations. No flame retarding effect of the basic polymer nor of the silicone oil is claimed.

EP 0960907 A1 discloses a flame-retardant thermoplastic composition comprising a basic thermoplastic resin, a halogen-containing flame retardant, a flame-retardant aid, silicone and magnesium hydroxide particles. All the working examples are disclosing the use of a halogen-containing flame retardant in combination with antimony trioxide as the flame-retardant aid both of which components are undesirable for reasons stated above and thus should be avoided.

US 2006/003006 A1 discloses a flame-retardant composition comprising at least one melamine compound, at least one metal borate, and at least one alkaline-earth metal hydroxide intended for use in powder coating compositions which also include a thermosetting epoxy resin and a hardener for said resin. The powder coating compositions thus obtained are used for encapsulation of electrical and electronic devices. There is no teaching of the use of this flame-retardant composition for the reduction of the flammability of common polymers such as polyolefins, e.g. polyethylene and polypropylene and others.

SUMMARY OF THE INVENTION

It is an object of the present invention to provide an effective flame retardant additive for polymers which flame retardant is free from halogens.

It is another object of the present invention to provide an effective flame retardant additive for polymers, which additive is free from antimony oxide.

It is a further object of the present invention to provide an effective flame retardant additive for polymers, which additive is free from phosphorus.

Still another object of the present invention is to provide an effective flame retardant additive for polymers, which additive only marginally affects the properties of the polymers.

It is a further object of the present invention to provide a flame retardant composition comprising a polymer and a flame retardant additive which additive is free from hazardous substances such as halogens, antimony oxide and phosphorous.

It is still another object of the present invention to provide a method of reducing the flammability of a polymer in which method a flame retardant additive is used which is free from hazardous substances such as halogens, antimony oxide and phosphorus.

In accordance with the present invention these and other objects may be attained by means of a flame retardant additive comprising a combination of differently flame retardant acting components the primary of which components is a polyacrylate, which is combined with members of at least three other groups of flame retardant substances, namely a) zinc borates, b) silicone resins and c) magnesium hydroxide and alumina trihydrate, but not halogens, antimony oxide and phosphorus-containing substances.

As used herein, "flame retardant additive" means a composition intended to be compounded or combined with a polymer the flammability of which should be reduced.

The term "polyacrylate", as used herein, is intended to encompass acrylic acid polymers, copolymers of acrylic acid and their ionomers and salts thereof, said polymers and copolymers being linear, branched or cross-linked and having different degrees of neutralization and cross-linking.

According to the present invention there is also provided a flame retardant composition comprising a polymer, the flammability of which should be reduced, and a flame retardant additive according to the invention.

Further in accordance with the present invention there is provided a method of reducing the flammability of a polymer which method comprises mixing said polymer with a flame retardant additive according to the present invention.

DETAILED DESCRIPTION OF THE INVENTION

According to a first aspect of the present invention there is provided a flame retardant additive for polymers comprising a polyacrylate in combination with
a) at least one zinc borate,
b) at least one silicone resin, and
c) alumina trihydrate or magnesium hydroxide or a mixture thereof, said additive being free of halogens, antimony oxide and phosphorus-containing substances.

The polyacrylate to be used in the flame retardant additive according to the invention is primarily a sodium or potassium salt of a polyacrylic acid polymer or copolymer although other metal salts such as calcium and magnesium salts of polyacrylic acid polymers or copolymers also may be contemplated.

Cross-linking of the chains of the acrylic acid polymers or copolymers may, if desired, be performed by using different cross-linking agents known in the art of cross-linking acrylic acid polymers or copolymers for the preparation of highly absorptive polymers for use in diapers. An example of such a cross-linking agent is divinylbenzene.

In accordance with a preferred embodiment of this aspect of the invention the polyacrylate is a salt of a cross-linked copolymer or graft copolymer of acrylic acid with an olefin or other appropriate monomer in order to improve the compability of the additive to the polymer the flammability of which should be reduced.

Polyacrylates (including polymers, copolymers and graft copolymers of acrylic acid) contemplated for use in the additive according to the present invention and having different degrees of cross-linking, different degrees of neutralization and different structures are available on the market from many manufacturers.

Heating of the flame retardant additive according to the invention results in the reaction of carboxyl or carboxylate groups of the acrylate polymer. According to the present invention it was surprisingly found that such cross-linking resulted in the formation of a dense mass of high stiffness, which mass is heat-stable and impermeable to oxygen. As far as applicants have found, this mechanism represents a new way of providing reduction in the flammability of polyolefin and other polymers.

Zinc borates according to the invention for use as a component a) of the additive exist in different forms on the market. Of interest for use in the additive according to the present invention are:

$$2ZnO.3B_2O_3.3.5H_2O; \quad \quad 1)$$

$$2ZnO.B_2O_3 \quad \quad 2)$$

$$4ZnO.B_2O_3.H_2O \quad \quad 3)$$

Silicone resins for use as component b) of the additive according to the present invention exist in powder form and are obtained by cryogenic milling of siloxane polymers. They are available from many suppliers in several grades with varying types of organic reactivity (none, epoxy, methacrylate). The organic reactivity controls the compability with the polymer matrix and also their performance as processing aid. Silicone resins also increase the thermal stability of the polymer.

Magnesium hydroxide and alumina trihydrate ($Al_2O_3.3H_2O$) for use as component c) of the additive according to the invention function by a similar mechanism and may be used inter-changeably or in combination in the additive according to the present invention. However alumina trihydrate is the substance of choice.

In accordance with a further embodiment of the present invention said flame retardant additive in addition to the polyacrylate and components a), b) and c) as defined above also comprises
d) at least one molybdenum compound selected from the group consisting of calcium zinc molybdate and zinc molybdate-magnesium silicate compounds and/or
e) a polymer layered silicate nanocomposite material.

Calcium zinc molybdate and zinc molybdate-magnesium silicate compounds for use as component d) of the additive according to the invention are available from e.g. Sherwin-Williams Chemicals.

In addition to the components a) to c) and possibly d) mentioned above the flame retardant additive according to the invention may also contain as a component e) a polymer layered silicate (PLS) nanocomposite material. PLS nanocomposites are hybrid organic polymer-inorganic materials containing layered silicates at molecular levels. Such nanocomposites are termed as intercalated or delaminated depending on the nano-morphology. In intercalated structures, polymer chains are inserted into the gallery space between the individual silicate layers and comprise of well ordered multi-layered structures. Delaminated structures are, however, obtained when the individual silicate layers are well dispersed in the organic polymer. PLS has been found to affect condensed phase reactions. One possible explanation can be that multilayered carbonaceous silicate structure may act as an excellent insulator and mass transport barrier, slowing the escape of volatile products generated during polymer decomposition.

Non-limiting examples of combinations of compounds a), b), c) and d) with a polyacrylate to form a flame retardant additive according to the invention are:
A combination of a polyacrylate with a zinc borate, a silicon resin and alumina trihydrate.
A combination of a polyacrylate with a zinc borate, a silicon resin, magnesium hydroxide and calcium zinc molybdate.
A combination of a polyacrylate with a zinc borate, a silicon resin, magnesium hydroxide, alumina trihydrate and calcium zinc molybdate.

The proportions of the polyacrylate and the different components a), b) and c) of the flame retardant additive according to the invention may be varied within wide limits depending on the polymer to which the additive is to be added. However in general the concentration of the polyacrylate and components a), b) and c) will be within the following limits (given in percent by weight calculated on the total weight of the additive):
Polyacrylate: 3-30%, preferably 5-15%;
Zinc borate: 5-20%, preferably 6-15%;
Silicone resin: 1-15%, preferably 3-10%;
Alumina trihydrate and/or magnesium hydroxide: 10-70%, preferably 20-40%.

Component d), when used, may comprise from 4 to 15% by weight, preferably from 1 to 10% by weight of the total weight of the additive.

Component e), when used, may comprise from 3 to 20% by weight, preferably from 5 to 10% by weight of the total weight of the additive.

According to a second aspect of the invention there is provided a flame retardant composition comprising a polymer, the flammability of which should be reduced, and a flame retardant additive, wherein the flame retardant additive is as set forth above.

According to the present invention the polymer, the flammability of which should be reduced, may be selected from the group consisting of polyethylenes, polypropylenes, polystyrenes, polyurethanes, polycarbonates and polycarbonate/acrylonitrile/butadiene/styrene block copolymerisates, preferably polyethylenes and polypropylenes.

The amount of the additive according to the invention to be added to the polymer in order to produce the flame retardant composition according to the invention will vary depending on the polymer used but will in general be within the range of from 5 parts by weight to 80 parts by weight, preferably from 10 parts by weight to 30 parts by weight calculates on 100 parts by weight of polymer (php).

According to a third aspect of the present invention there is provided a method of reducing the flammability of a polymer, which method comprises mixing said polymer with a flame retardant additive according to the invention.

Testing methods for the evaluation of flammability of materials.

Among methods used for the evaluation of flammability of materials those methods which really reflect fire retarding mechanisms as discussed above and also measure such properties are very important both for the development and the evaluation of the usefulness and effectivity of FR-additives.

Both full scale and bench scale test methods are important for this purpose. Full-scale methods of interest are mainly based on the oxygen consumption principle. According to this principle a definite amount of heat (J) is generated for a fixed number of oxygen removed from the exhaust. For most combustible materials including polymers, 13.1 MJ of heat is released for each kg of oxygen consumed from the air with a deviation of ±5% from this value. The material need not to burn fully in order that the above relation should hold. The above value holds very well for all the hydrocarbons except when polymers contain significant fractions of O, N, Cl, Br, F or S.

Since testing methods are essential from the point of view of quality control assurance in manufacturing and for the product development, it is necessary to develop bench-scale test methods which are not only simple to run, but also could predict the full-scale performance of the materials. Such bench-scale test methods are necessary to determine the following fire related properties of the materials:

1) Ignition
2) Flame spread
3) Rates of heat release and production of smoke, toxic gases and corrosive products So far ignition is concerned, it is of interest to determine ignition of materials as a result of external source of heat or fire. ISO 5657 describes a radiant exposure ignitability test for specimens in a horizontal orientation. Such tests can also be performed in Cone Calorimeter and LIFT (Lateral Ignition and Flame Spread Test) apparatus. LIFT apparatus tests specimens are oriented vertically, while the Cone Calorimeter is used for testing in either orientation. Since radiant ignitability is only a small component of the fire development process, no efforts have been made to provide direct large-scale validation for the bench-scale data.

Since in a fire process, materials gets progressively involved as a result of gradual spreading of flame, it is important to determine the fire spreading behaviour of materials. Such test methods have been described in ASTM and ISO standards E 1321 and DP 5658 respectively and the test apparatus used is named LIFT. In this case also validation of LIFT apparatus data against large-scale data are not available.

Another method of interest to evaluate the flammability of polymeric materials is oxygen index (OI) method. According to this method a vertically clamped polymer sample is burned in a stream of oxygen and nitrogen. The strip is ignited at the top. OI is the volume percentage of oxygen at which the material no longer self-extinguishes. In general, higher the OI-value better is the flame retardation. For example, for carbon, which is considered to be non-flammable, the OI is 60%. In electronic industry, the flammability of materials is determined according to Glow-wire test described in IEC 695-2-1, 1994. According to this method a glow-wire comprising of a specific loop of Ni/Cr (80/20) wire is heated to 960° C. and horizontally contacted with the specimen at a force of 0.8 to 1.2 N. The contact is maintained until the glow-wire or the specimen moves horizontally towards one another over a distance of at least 7 mm. The specimen is considered to pass the test if following of the two conditions are fulfilled:

1 There is no flame or glowing.
2 If flames or glowing extinguishes within 30 s after removal of the glow-wire.

Cone Calorimeters have been developed to determine all the necessary fire properties of materials and the test methods have been described in ASTM standards E 1354 and STP 983 and ISO standard DIS 5660. The apparatus makes use of an electric heater in the form of a truncated cone where the heater is capable of being set to a wide variety of heating fluxes (0-100 kW/m$^2$).

In Cone Calorimeter measurements, Heat Release Rates (HRR) are reported in kW/m$^2$, smoke data in specific extinction area (m$^2$) generated per mass (kg) of specimen decomposed. The smoke data are expressed in M$^2$/kg. Efforts are being made to validate-Cone Calorimeter data with full-scale tests data.

In a recent report, Gregory et al (2000) compared Cone Calorimeter data with other testing methods such as UL 1581 for several cable samples where the peak heat release rate (HRR) was compared with damage length. Very good correlations have been reported.

Beside the above-mentioned measurements several other quantitative analytical techniques such as Differential Scanning Calorimeter (DSC) and Thermo Gravimetric Analysis (TGA) have also been found very useful in the evaluation of fire retardancy. From DSC measurements, it was possible to determine the melting and decomposition temperatures of FR additives whereas TGA can be used to evaluate the FR efficiency of such additives by estimating the changes in the polymer decomposition temperatures, rate and activation energies for weight losses, extent of char formation etc.

In the development and evaluation of the novel fire retardant (FR) additives according to the invention, the following testing strategies were used:

1 Evaluation of the transition temperatures of the FR additives using DSC.
2 Evaluation of the thermal degradation behaviour of both the FR additive alone and in combination with polymers.
3 Different FR formulations were either evaluated alone or in combinations, for the direct burning of the materials with Bunsen burner. Some of the formulations were also evaluated by Cone Calorimetry.
4 After these evaluations, the formulations were also tested in order to determine the influence of such additives on the mechanical and the processing properties of the formulations.

The following working examples will further illustrate the invention without limiting the scope thereof.

Example 1

Comparative; not According to the Invention

In a series of experiments using varying amounts of flame retardant substances 5-20 parts by weight of zinc borate, 1-10 parts by weight of a silicone resin, 10-50 parts by weight of magnesium hydroxide and 1-20 parts by weight of molybdenum coated on calcium and zinc were mixed with 100 parts by weight of polyethylene (PE) and the properties such as onset temperature for thermal degradation, thermal degradation rate under isothermal temperature of 250° C., mechanical properties, melt index, water absorption properties, morphological properties and finally the burning properties were evaluated and compared with PE without any additive. Addition of these additives increased the onset temperature for thermal degradation and reduced dramatically the thermal degradation rate without affecting the mechanical, morphological and the processing properties of PE. The burning properties showed that ignition time was increased from a few seconds to 7-8 seconds without generating much smoke. Furthermore, the burning process was very slow and the polymer also melted very slowly compared to PE without additives. The burning tests were performed on a subjective basis on 10 mm wide and 50 mm long rods with 2-3 mm thickness by holding them in a vertical position and then bringing a 50 mm long butane flame without air at 0.4 bar pressure at 10 mm distance at an angle of 45° so that the flame covers the under side of the rod and noting the time when it starts burning. Once the rod starts burning, we also observed the intensity of smoke formation, the time when the first drop falls and finally the spreading speed of the flame.

Example 2

A series of experiments similar to those of Example 1 was carried out but 2 to 25 parts by weight of a sodium salt of a cross-linked acrylic acid polymer was included. Such materials are available e.g. from BASF AG. Inclusion of said salt tremendously improved the burning properties of the PE. Th burning time was enhanced from 7-8 seconds for the PE formulations of Example 1 to 15-20 seconds and also the time when the first melted drop fell was substantially prolonged. Thus addition of said salt improved the fire properties in a remarkable way without affecting the properties of the PE in any measurable way.

Example 3

A series of experiments similar to those of Example 2 were carried out but the magnesium hydroxide was replaced by corresponding amounts of alumina trihydrate (ATH). Similar improvements in the fire properties as in Example 2 were obtained.

Example 4

A series of experiments similar to those of Examples 2 and 3 were performed but a combination of 15 parts by weight of ATH and 15 parts by weight of magnesium hydroxide was used throughout the series of experiments.

Similar improvements in the fire properties as in Examples 2 and 3 were obtained.

Example 5

Comparative; not According to the Invention

A flame retardant composition was prepared by mixing the following ingredients (in % by weight calculated on the total weight of the composition):

| | |
|---|---|
| Polypropylene (PP) | 90% |
| Calcium zinc molybdate | 1.43% |
| Silicone resin | 1.43% |
| Zinc borate | 7.14% |
| Total | 100.0% |

This composition was denoted "PP2".

Example 6

A flame retardant composition was prepared by mixing the following ingredients (in % by weight calculated on the total weight of the composition):

| | |
|---|---|
| Polypropylene (PP) | 66.7% |
| Silicone Resin | 3.3% |
| Zinc borate | 6.7% |
| Alumina trihydrate (ATH) | 16.6% |
| Sodium salt of crosslinked polyacrylic acid | 6.7% |
| Total | 100.0% |

This composition was denoted "PP 34".

Example 7

A flame retardant composition was prepared by mixing the following ingredients (in % by weight calculated on the total weight of the composition):

| | |
|---|---|
| PP | 60.6% |
| Silicone Resin | 3.0% |
| Zinc borate | 6.1% |
| ATH | 18.2% |
| Sodium salt of crosslinked polyacrylic acid | 12.1% |
| Total | 100.0% |

This composition was denoted "PP 36".

Example 8

A flame retardant composition was prepared by mixing the following ingredients (in % by weight calculated on the total weight of the composition):

| | |
|---|---|
| PP | 52.6% |
| Silicone Resin | 2.6% |
| Zinc borate | 5.3% |
| ATH | 26.3% |
| Sodium salt of crosslinked polyacrylic acid | 13.2% |
| Total | 100.0% |

This composition was denoted "PP 38".

Cone calorimeter tests were performed on polypropylene without additive ("PP1") and the compositions of Examples 5 to 8 (i.e. PP2, PP34, PP36 and PP38, respectively). The results are reported in Table 1 below.

TABLE 1

Cone Calorimeter values for polymer samples at heat flux 35 kW/m$^2$

| Properties | PP 1 (without additive) | PP 2 | PP 34 | PP 36 | PP 38 |
|---|---|---|---|---|---|
| RHR$_{max}$ (kW/m$^2$) | 1450 | 1370 | 234 | 223 | 174 |
| EHC (MJ/kg) | 35.0 | 34.7 | 33 | 31 | 30 |
| SEA (m$^2$/kg) | 890 | 780 | 538 | 497 | 449 |

RHR$_{max}$ Rate of heat release per exposed area, peak
EHC Effective heat combustion per mass loss, average during burning period
SEA Specific (smoke) extinction area per mass loss, average during burning period Rate of heat release (RHR) as a function of time for PP formulation with and without additives and containing sodium salt of cross-linked polyacrylic acid (PP 34, PP36 and PP 38) are summarized in Table 2 below:

TABLE 2

RATE OF HEAT RELEASE VS. BURNING TIME

| Sample | Rate of heat release in kW/m2 | | | | |
| --- | --- | --- | --- | --- | --- |
|  | 100 s | 200 s | 400 s | 600 s | 800 s |
| PP 1 | 1450 | 0 | 0 | 0 | 0 |
| PP 34 | 190 | 175 | 160 | 120 | 20 |
| PP 36 | 185 | 225 | 155 | 60 | 20 |
| PP 38 | 155 | 160 | 140 | 130 | 40 |

Example 9

A series of experiments similar to those of example 2 were carried out but the sodium salt of a cross-linked acrylic acid polymer was replaced by a partially neutralized linear polyacrylic acid. Such materials are available from Ciba Specialty Chemicals. Similar improvements in the fire properties as in example 2 were obtained.

Example 10

A series of experiments similar to those of example 2 were carried out but the sodium salt of a cross-linked acrylic acid polymer was replaced by a copolymer of acrylic acid and ethylene. Such materials are available from Exxon and DuPont. Similar improvements in the fire properties as in example 2 were obtained.

Example 11

A series of experiments similar to those of example 2 were carried out but the sodium salt of a cross-linked acrylic acid polymer was replaced by a zinc or sodium ionomers of copolymers of acrylic acid and ethylene. Such materials are available from Exxon and DuPont. Similar improvements in the fire properties as in example 2 were obtained.

The invention claimed is:

1. A flame retardant composition, comprising:
   at least one polymer selected from the group consisting of polyethylene, polypropylene, polystyrene, polyurethane, polycarbonate and polycarbonate/acrylonitrile/butadiene/styrene block copolymer; and
   a flame retardant additive comprising a polyacrylate which is a salt of a polyacrylic acid, a salt of a crosslinked polyacrylic acid, a salt of a copolymer of acrylic acid with an olefin or other monomer, a salt of a crosslinked copolymer of acrylic acid with an olefin or other monomer or a salt of a graft copolymer of acrylic acid with an olefin or other monomer improving the compatibility of the additive with the polymer, in combination with
   a) at least one zinc borate,
   b) at least one silicone resin, and
   c) alumina trihydrate or magnesium hydroxide or a mixture thereof,
   said additive being free of halogens, antimony oxide and phosphorus-containing substances.

2. The flame retardant composition according to claim 1, wherein the flame retardant additive also comprises:
   d) at least one molybdenum compound selected from the group consisting of calcium zinc molybdate and zinc molybdate-magnesium silicate compounds, and/or
   e) a polymer layered silicate nanocomposite material.

3. The flame retardant composition according to claim 2, comprising the polyacrylate in combination with zinc borate, silicone resin, alumina trihydrate and calcium zinc molybdate.

4. A flame retardant composition comprising the at least one polymer, and a flame retardant additive, wherein the flame retardant additive is as set forth in claim 3.

5. The flame retardant composition according to claim 2, comprising polyacrylate in combination with zinc borate, silicone resin, magnesium hydroxide and calcium zinc molybdate.

6. A flame retardant composition comprising the at least one polymer, and a flame retardant additive, wherein the flame retardant additive is as set forth in claim 5.

7. The flame retardant composition according to claim 2, comprising the polyacrylate in combination with zinc borate, silicone resin, magnesium hydroxide, alumina trihydrate and calcium zinc molybdate.

8. A flame retardant composition comprising the at least one polymer, and a flame retardant additive, wherein the flame retardant additive is as set forth in claim 7.

9. A flame retardant composition comprising the at least one polymer, and a flame retardant additive, wherein the flame retardant additive is as set forth in claim 2.

10. The flame retardant composition according to claim 1, comprising the polyacrylate in combination with zinc borate, silicone resin and alumina trihydrate.

11. A flame retardant composition comprising the at least one polymer and a flame retardant additive, wherein the flame retardant additive is as set forth in claim 10.

12. The flame retardant composition according to claim 1, wherein the polyacrylate is a sodium or potassium salt of a crosslinked polyacrylic acid.

13. A flame retardant composition comprising the at least one polymer, and a flame retardant additive, wherein the flame retardant additive is as set forth in claim 12.

14. The flame retardant composition according to claim 1, which also contains a polymer layered silicate composite material.

15. A flame retardant composition comprising the at least one polymer, and a flame retardant additive, wherein the flame retardant additive is as set forth in claim 14.

16. The flame retardant composition according to claim 1, wherein the polyacrylate is a salt of a copolymer of acrylic acid with an olefin or other monomer or a salt of a graft copolymer of acrylic acid with an olefin or other monomer in order to improve the compatibility of the additive with the polymer.

17. A method of reducing the flammability of the at least one polymer which method comprises mixing said at least one polymer with the flame retardant additive according to claim 1.

18. A flame retardant additive for polymers, comprising:
    a polyacrylate which is a salt of a polyacrylic acid, a salt of a crosslinked polyacrylic acid, a salt of a copolymer of acrylic acid with an olefin or other monomer or a salt of a crosslinked copolymer of acrylic acid with an olefin or other monomer improving the compatibility of the additive with the polymer, in combination with
    a) at least one zinc borate,
    b) at least one silicone resin, and
    c) alumina trihydrate or magnesium hydroxide or a mixture thereof,
    said additive being free of halogens, antimony oxide and phosphorus-containing substances.

19. The flame retardant additive according to claim 18, wherein the flame retardant additive also comprises:

d) at least one molybdenum compound selected from the group consisting of calcium zinc molybdate and zinc molybdate-magnesium silicate compounds, and/or e) a polymer layered silicate nanocomposite material.

20. The flame retardant additive according to claim 18, comprising the polyacrylate in combination with zinc borate, silicone resin and alumina trihydrate.

* * * * *